United States Patent
Zuelke

(10) Patent No.: US 11,904,554 B2
(45) Date of Patent: Feb. 20, 2024

(54) SYSTEMS AND METHODS HAVING A HEAT SINK FOR INDUCTION WELDING

(71) Applicant: The Boeing Company, Chicago, IL (US)

(72) Inventor: Eric David Zuelke, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/585,389

(22) Filed: Jan. 26, 2022

(65) Prior Publication Data

US 2022/0242055 A1  Aug. 4, 2022

Related U.S. Application Data

(60) Provisional application No. 63/143,218, filed on Jan. 29, 2021.

(51) Int. Cl.
| | |
|---|---|
| B29C 65/36 | (2006.01) |
| H05B 6/10 | (2006.01) |
| B64F 5/10 | (2017.01) |
| B29C 65/00 | (2006.01) |
| B29L 31/30 | (2006.01) |

(52) U.S. Cl.
CPC ........ *B29C 65/36* (2013.01); *B29C 66/73921* (2013.01); *B64F 5/10* (2017.01); *H05B 6/10* (2013.01); *B29L 2031/3076* (2013.01)

(58) Field of Classification Search
CPC ..... B29C 65/36; B29C 66/73921; B64F 5/10; H05B 6/10
See application file for complete search history.

(56) References Cited

U.S. PATENT DOCUMENTS

| | | | | |
|---|---|---|---|---|
| 4,992,133 | A * | 2/1991 | Border | B29C 65/3668 100/312 |
| 6,039,114 | A * | 3/2000 | Becker | H01L 23/473 257/E23.098 |
| 2005/0061473 | A1 * | 3/2005 | Fletcher | F28F 3/022 165/80.4 |

* cited by examiner

*Primary Examiner* — Daniel McNally
(74) *Attorney, Agent, or Firm* — Jordan IP Law, LLC

(57) ABSTRACT

A heatsink, a method of manufacturing the heatsink, and an induction welding apparatus including the heatsink. The heatsink includes a carrier sheet and a plurality of tiles. The carrier sheet comprises an electrically non-conductive material and has a contoured profile. The plurality of tiles comprises a thermally conductive and electrically non-conductive material. Each tile of the plurality of tiles has a bonding surface bonded to the carrier sheet and a contact surface opposite the bonding surface. The contact surface is configured to contact a structure to be induction welded.

15 Claims, 12 Drawing Sheets

SYSTEMS AND METHODS HAVING A HEAT SINK FOR INDUCTION WELDING

CROSS-REFERENCE TO RELATED APPLICATION

This application claims the benefit of and priority to U.S. Provisional Application No. 63/143,218, entitled "SYSTEMS AND METHODS HAVING A HEAT SINK FOR INDUCTION WELDING", filed Jan. 29, 2021, which is incorporated by reference herein in its entirety.

BACKGROUND

Induction welding uses electromagnetic induction to heat objects without contacting the surface of the objects. For example, two objects can be welded together at a joint by induction welding and neither object is contacted by the induction welding coil itself. The electromagnetic flux created by the induction coil will create eddy currents in the conductive fibers of composites causing the composites to heat up. A heatsink can be used to cool the surface of the part that the heatsink comes in contact with so that the heat is concentrated at the weld line of components to be welded. Cooling the outer part of the surface prevents the surface from melting and causing tolerance inconsistencies in the welded parts. In order to optimize heat distribution across the joint between the two objects, the shape and contour of the heatsink must reasonably match the surface of the objects to be welded. However, because the heatsink elements are planar, it is often challenging to effectively induction weld contoured objects out of tolerance inconsistencies in the joint due to mismatched contours between the objects and the heat sink. Furthermore, unique structures, such as small or exotically contoured structures, can be fabricated from thermoplastic components if fastened together without an additional, structural fastener.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

In one implementation, a heatsink is provided. The heatsink comprises a carrier sheet and a plurality of tiles. The carrier sheet comprises an electrically non-conductive material and has a contoured profile. The plurality of tiles comprises a thermally conductive and electrically non-conductive material. Each tile of the plurality of tiles has a bonding surface bonded to the carrier sheet and a contact surface opposite the bonding surface. The contact surface is configured to contact a structure to be induction welded.

In another implementation, a method of manufacturing a heatsink is provided. The method includes arranging a plurality of tiles on a carrier sheet, where each tile of the plurality of tiles comprises a bonding surface and a contact surface opposite the bonding surface and the contact surface is configured to contact a structure to be induction welded. The method further comprises bonding the bonding surface of each tile of the plurality of tiles to the carrier sheet and machining the plurality of tiles bonded to the carrier sheet such that the contact surface of the plurality of tiles includes a contoured shape.

In another implementation, an induction welding apparatus is provided. The induction welding apparatus comprises a heatsink, an induction welding coil, a clamp, and a non-conductive tooling block. The heatsink includes a carrier sheet and a plurality of tiles bonded to the carrier sheet. The carrier sheet comprises an electrically non-conductive material and has a contoured profile. The plurality of tiles comprises a thermally conductive and electrically non-conductive material, and each tile of the plurality of tiles includes a bonding surface bonded to the carrier sheet and a contact surface opposite the bonding surface. The clamp is configured to apply pressure to two or more composite components to be induction welded. The contact surface is configured to contact one of the two or more composite components to be induction welded. The non-conductive tooling block contacts the carrier sheet of the heatsink such that the heatsink is between the non-conductive tooling block and the clamp. The induction welding coil is configured to induction weld the two or more composite components together by generating an electromagnetic current.

In another implementation, a method of drawing off heat into a heatsink is provided. The method comprises applying a magnetic flux to a weld interface between a first thermoplastic component and a second thermoplastic component, heating the weld interface between the first thermoplastic component and the second thermoplastic component using the applied magnetic flux, and drawing, by the heatsink, heat off of a contoured surface of the first thermoplastic component.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts:

Corresponding reference characters indicate corresponding parts throughout the drawings. In FIGS. 1 to 10, the systems are illustrated as schematic drawings. The drawings may not be to scale.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

As described herein, various implementations incudes a heat sink having a shape that matches the shape of objects to be induction welded in order to provide uniform heat distribution across the joint between the objects to be induction welded. The shaped heat sink overcomes, for example, the challenges when induction welding objects that have a contoured shape, or profile. That is, one or more heatsinks described herein are suitable for induction welding of curved components instead of using a plurality of individual heatsinks in specific locations of a surface to be welded. As such, the heatsinks of the present disclosure can be easily replaced or transferred to another location for welding. As a result, the cost and time involved in tooling is reduced, in that individual heat sinks are not needed, wherein each would have to be numbered and placed in an exact, specific position (e.g., prohibitively expensive and time consuming to produce and use). Thus, cost effective and efficient heatsinks are provide for induction welding of non-planar surfaces, such as different shaped curved components.

More particularly, various implementations of the present disclosure provide a heat sink for thermoplastic induction welding, such as thermoplastic welding, that matches the contour of a curved component to be induction welded, such as a thermoplastic composite. In various implementations, the heat sink described herein is of uniform or near-uniform thickness to enable uniform heat distribution for induction welding of the thermoplastic objects. Additional implementations of the present disclosure provide a method of manufacturing a heat sink that matches the contour of a curved part to be induction welded.

Figure 1A:
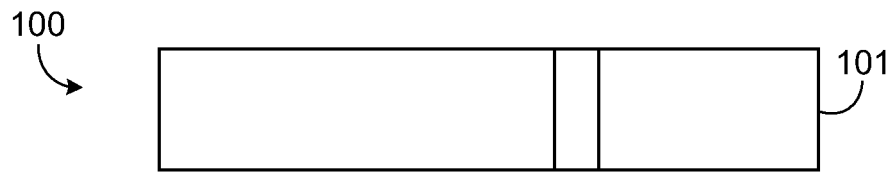
FIG. 1A illustrates a top view of a heatsink according to various implementations of the present disclosure.
Figure 1B:
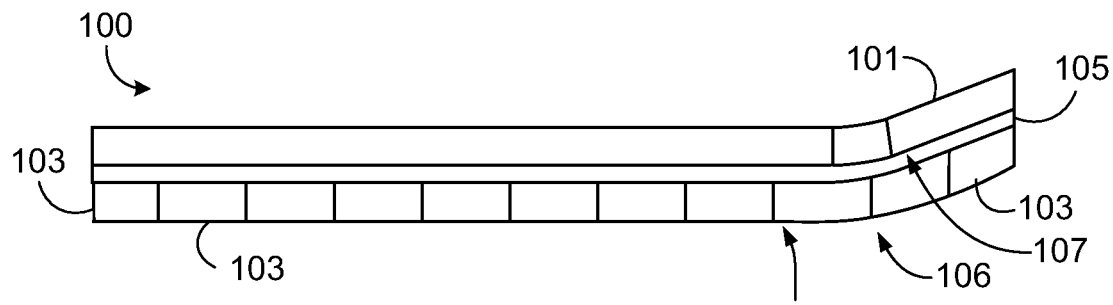
FIG. 1B illustrates a side view of a heatsink according to various implementations of the present disclosure.
Figure 1C:
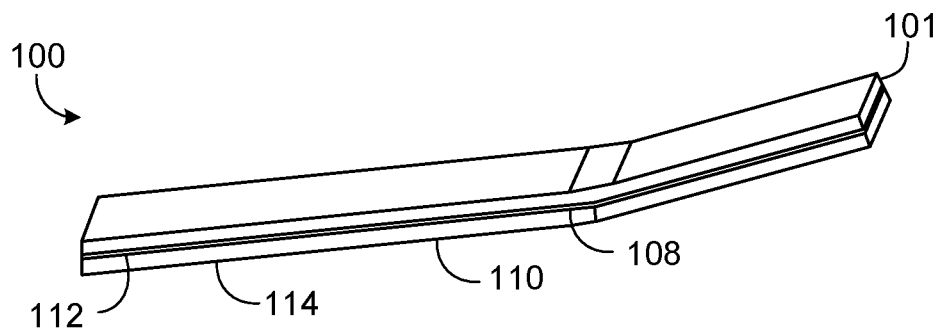
FIG. 1C illustrates a top perspective view of a heatsink according to various implementations of the present disclosure.

FIGS. 1A-1C illustrate a heatsink 100 according to various implementations of the present disclosure. FIG. 1A illustrates a top view of the heatsink 100, FIG. 1B illustrates a side view of the heatsink 100, and FIG. 1C illustrates a top perspective view of the heatsink 100. The examples of the heatsink 100 illustrated in FIGS. 1A-1C is for illustration only. Other implementations of a heatsink can be used without departing from the scope of the present disclosure. That is, the present disclosure contemplates heat sinks having different shapes, sizes, configurations, etc. In some implementations, the heatsink 100 is used to fabricate a portion of an aircraft, such as the aircraft 900.

In the illustrated example, the heatsink 100 includes a multi-layered structure that allows for conformance to a curved surface, particularly a curved surface of components to be induction welded. In other words, the multi-layered structure allows the heatsink 100 to be complementary to the curved surface. For example, a carrier sheet 101 defines or forms a first layer. The carrier sheet 101 comprises a material that is both thermally non-conductive and electrically non-conductive. In some implementations, the carrier sheet 101 is comprised of fiberglass. However, in various implementations the carrier sheet 101 is comprised of any non-metal material that is both thermally non-conductive and electrically non-conductive. The material of the carrier sheet 101 is a structurally rigid sheet in one example that provides structure and stiffness for the heatsink 100 (e.g., supports element thereon) and reduces or minimizes the possibility that elements bonded thereto, such as a plurality of tiles 103 described below, are not sufficiently bonded and maintained in a curved or contoured configuration.

In some implementations, the carrier sheet 101 has a contoured profile (e.g., a defined shaped or configuration). In some implementations, the contoured profile of the carrier sheet 101 is complementary to a contour of a material to be welded. That is, the carrier sheet 101 is configured to have a contour 107 that matches or is complementary to the contour of one or more components to be induction welded. In some implementations, the contour 107 of the carrier sheet 101 is complementary to a contour of a tooling block used to induction weld the material to be welded. That is, the carrier sheet 101 is configured to have a contour 107 that is complementary to the contour of the tooling block (e.g. matches the contour of the tooling block in some examples). In one example, the carrier sheet 101 is less than one half inch thick. In some implementations, the carrier sheet 101 is approximately 0.1 inches thick. As should be appreciated, the carrier sheet 101 can define the first layer having other thickness values, such as based on a desired stiffness or flexibility, a particular application, a system configuration, etc.

The heatsink 100 further includes a plurality of tiles 103 that defines or forms a second layer. Each tile 103 of the plurality of tiles 103 comprise a material that is thermally conductive and electrically non-conductive. That is, unlike the carrier sheet 101, the plurality of tiles are thermally conductive.

In some implementations, each tile of the plurality of tiles 103 is a billet comprised of a ceramic material, such as aluminum nitride. The aluminum nitride ceramic material provides sufficient structural rigidity without being electrically conductive, while having thermal conduction properties. In some implementations, the second layer formed from the plurality of ceramic tiles 103 has a uniform or near-uniform thickness for consistent heat transfer. That is, along the length and/or width of the second layer, the plurality of tiles 103 are configured (e.g., machined as described in more detail herein) to define a contour having a uniform thickness. In one example, the plurality of tiles 103 is also less than one half inch thick. In some implementations, the plurality of tiles 103 is less than 0.15 inches thick. As should be appreciated, the plurality of tiles 103 can define the second layer having other thickness values, such as based on a desired stiffness or flexibility, a particular application, a system configuration, etc.

Each of the plurality of tiles 103 includes a bonding surface 112 and a contact surface 114 opposite the bonding surface 112. That is, opposite sides of each tile of the plurality of tiles 103 define the bonding surface 112 and the contact surface 114. It should be noted that bonding surface 112 and the contact surface 114 in some examples have the same properties or configuration (e.g., a same smoothness, texture, etc.). However, in other examples, the bonding surface 112 and the contact surface 114 have different properties or configurations. That is, the surface structure or characteristics of the bonding surface 112 and the contact surface 114 can be the same or different. For example, the bonding surface 112 in some examples is configured to have properties more suitable for bonding to another surface.

The bonding surface 112 is coupled to (e.g., bonded to) the carrier sheet 101. For example, the bonding surface 112 is bonded to the carrier sheet 101 by an adhesive 105 that provides sufficient adhesion between the bonding surface 112 and the carrier sheet while not interfering with the induction welding process. In one example, the adhesive is an epoxy resin, but other adhesives can be used without departing from the scope of the present disclosure. Additionally, the amount of adhesive 105 used can be varied, such as to form a thicker or thinner layer of the adhesive 105. The adhesive 105 allows for the plurality of tiles 103 to be securely affixed to the carrier sheet 101 along the contoured profiled of the carrier sheet 101. That is, while the entire surface of the each tile 103 may not contact the carrier sheet 101 (e.g., an end or corner may be slightly lifted from the carrier sheet 101, the adhesive 105 is configured to securely hold the tiles 103 to the carrier sheet 101 to allow for further configuring of the tiles 103 (e.g., machining of the tile 103). The adhesive 105 in some examples is also applied so as to fill in any gaps 106 between adjacent tiles 103, such as resulting from the contour of the carrier sheet 101 to which the tiles 103 are affixed (e.g., the gap 106 between two tilted tiles 103). By filling in any gaps 106 between adjacent tiles 103, the tiles 103 are more closely bonded together to prevent shifting on the carrier sheet 101 and the contour of the bonding surface 112 is manufactured as close to the contour of the carrier sheet 101 as possible.

In some implementations, a subset of the plurality of tiles 103 that comprises the second layer (e.g., a tile sheet) has a contoured shape. In particular, one or more of the bonding surface 112 and the contact surface 114 includes a contoured shape in some implementations. For example, the bonding surface 112 includes a first contour 108 complementary to the contour of the carrier sheet 101. Similarly, the contact surface 114 includes a second contour 110, complementary to the first contour 108, that matches a contour of a surface of a structure to be induction welded using the heatsink 100. In some implementations, the first contour 108 and the second contour 110 are identical. In other implementations, the first contour 108 and the second contour 110 are different. The relationship between the first contour 108 and the second contour 110 will be described in greater detail in the description of FIGS. 2A-2C below. It should be noted that the tiles 103 in this example can be formed with contoured surfaces or have contoured surface formed, such as by a machining process.

Figure 2A:
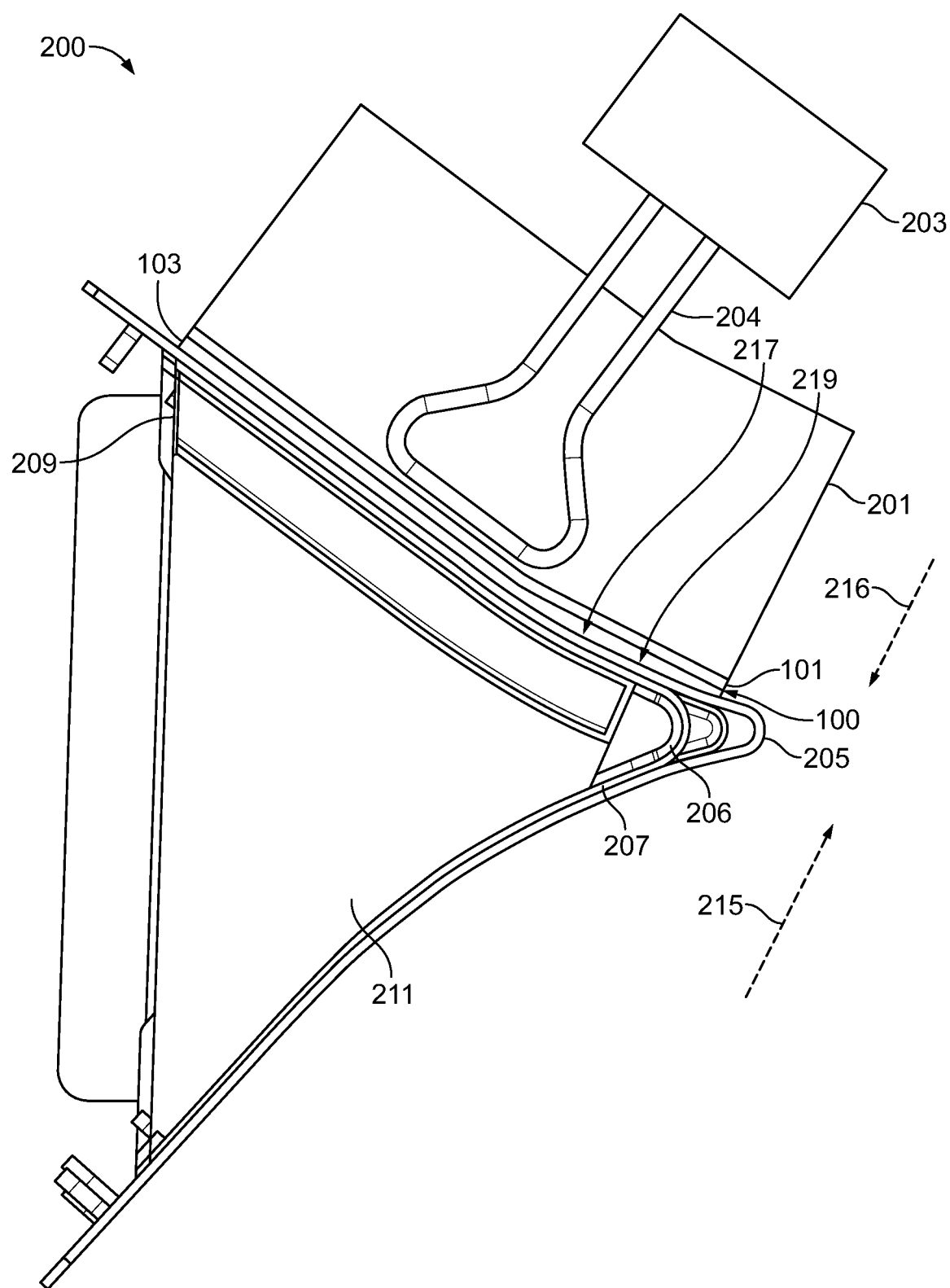
FIG. 2A illustrates a cross-section view of an induction welding setup according to various implementations of the present disclosure.
Figure 2B:
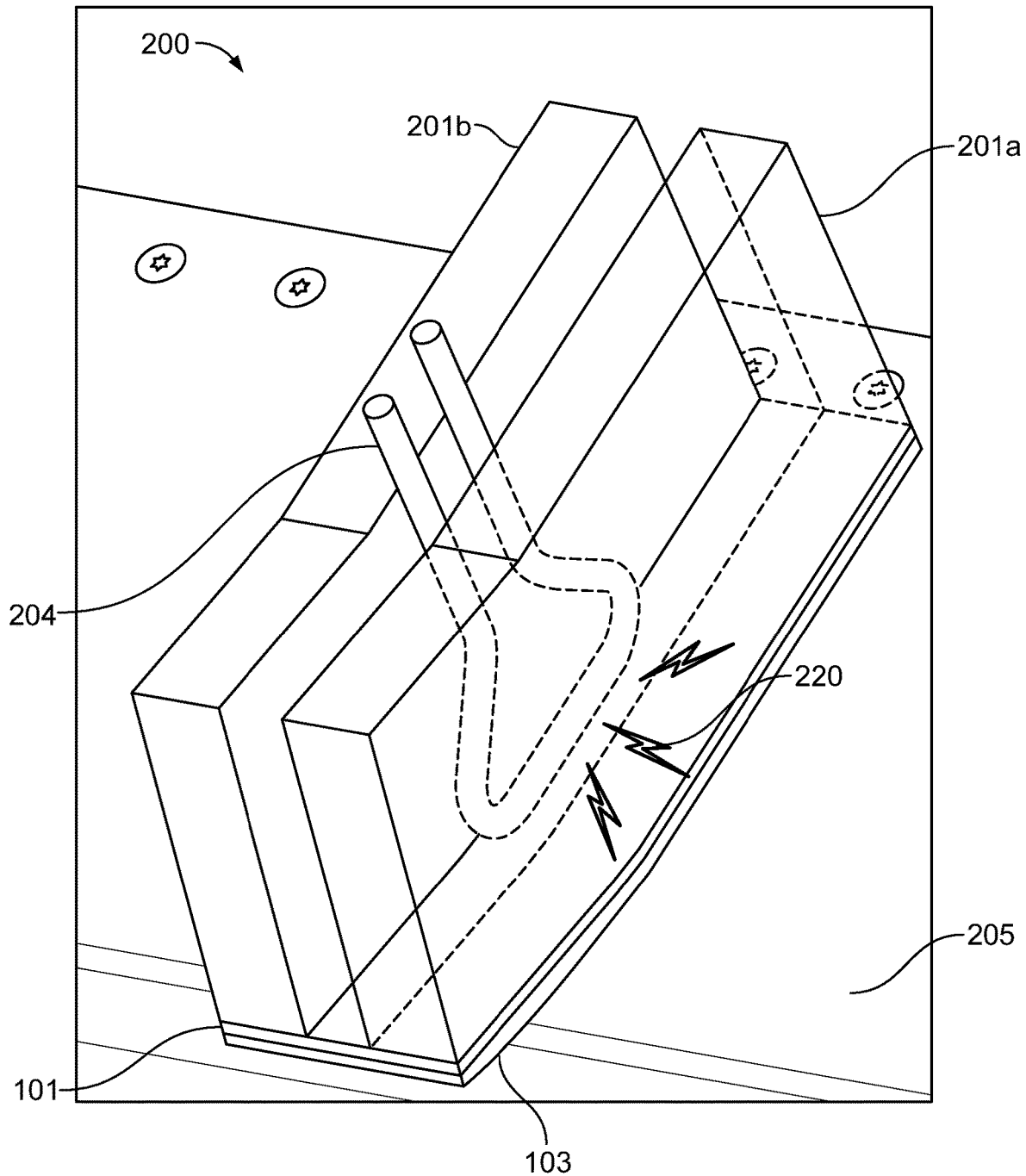
FIG. 2B illustrates a top perspective view of the induction welding setup according to various implementations of the present disclosure.
Figure 2C:
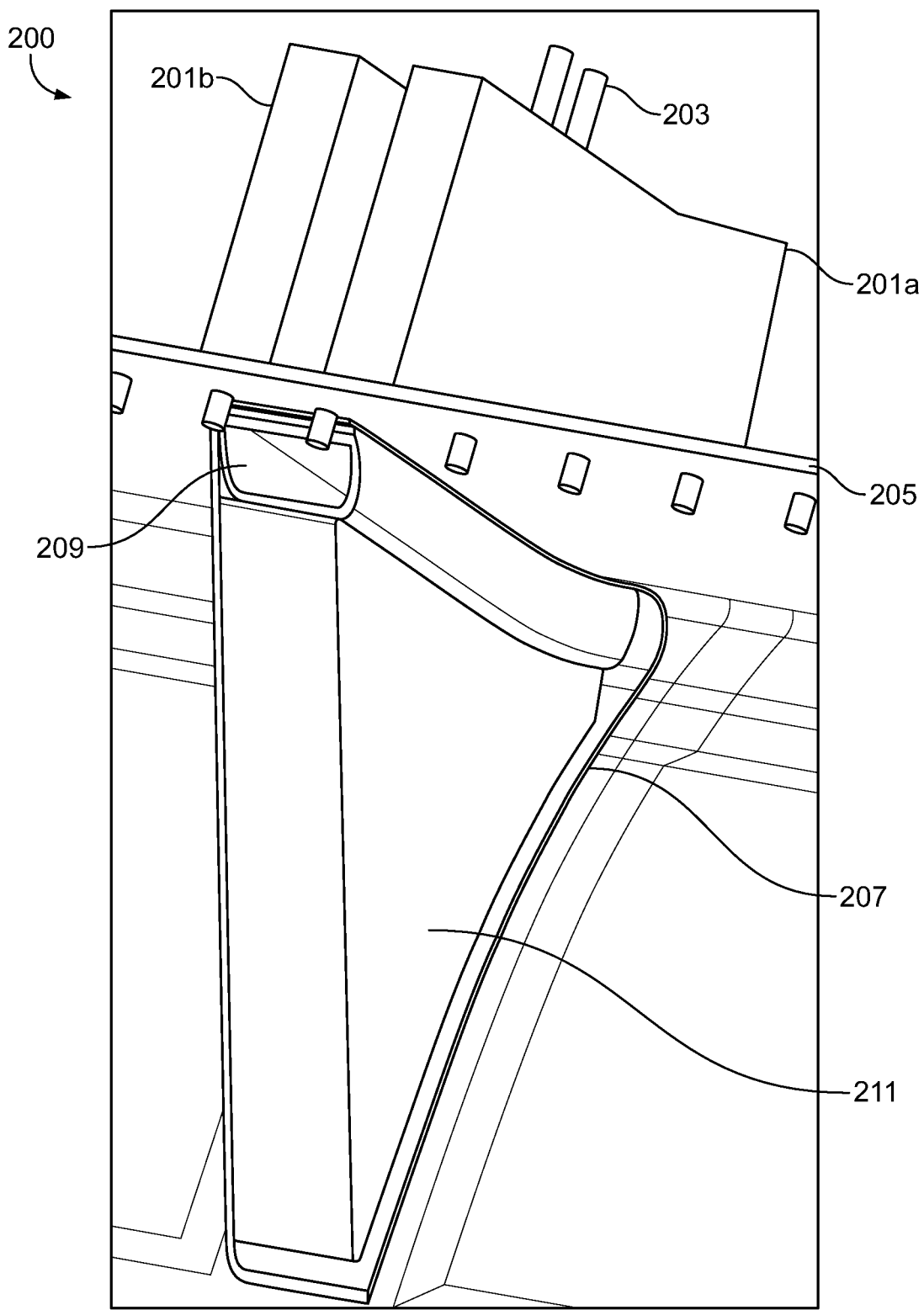
FIG. 2C illustrates a bottom perspective view of the induction welding setup according to various implementations of the present disclosure.

FIGS. 2A-2C illustrates an induction welding setup according to various implementations of the present disclosure. In particular, FIGS. 2A-2C illustrate a rib joined to two skin panels as part of an air foil, such as a flap, slat, spoiler, rudder, aileron, or elevator according to various implementations of the present disclosure. FIG. 2A illustrates a cross-section view of the induction welding setup, FIG. 2B illustrates a top perspective view of the induction welding setup, and FIG. 2C illustrates a bottom perspective view of the induction welding setup according to various implementations of the present disclosure. That is, FIGS. 2A-2C show a configuration that is set up to perform induction welding using multi-layer contoured heatsink structure, such as the heatsink 100. The examples of the induction welding apparatus illustrated in FIGS. 2A-2C is for illustration only. Other implementations of an induction welding apparatus can be used without departing from the scope of the present disclosure. In some implementations, the induction welding setup 200 is used to fabricate a portion of an aircraft, such as the aircraft 900.

The induction welding setup 200 includes the heatsink 100 illustrated in FIGS. 1A-1C. For example, FIG. 2A illustrates the carrier sheet 101 bonded to the bonding surface 112 of the plurality of tiles 103. The opposite surface of the carrier sheet 101, in other words the surface not bonded to the plurality of tiles 103, is in contact with a non-conductive tooling block 201. The non-conductive tooling block 201 in some examples forms part of an induction welding system. In one example, the non-conductive tooling block 201 is made of a plastic material operable at and resistant to high temperatures, such as temperatures for performing induction welding (e.g., weld two or more composite components together at a temperature between 325° C. and 400° C.). For example, the non-conductive tooling block 201 can be made of Polyoxymethylene (POM). However, other suitable materials may be used.

The induction welding setup 200 further illustrates an induction welding machine 203 that includes an induction welding coil 204. As shown in FIG. 2B, the induction welding coil 204 is placed between two non-conductive tooling blocks 201. The induction welding coil 204 performs induction welding on two surfaces, such as a thermoplastic skin 205 and a thermoplastic rib 207, through the heatsink 100. That is, the induction welding coil 204 is positioned or brought into close proximity above the heatsink 100 to perform induction welding of two component parts, such as to thermoplastic component parts. In the illustrated example, the parts of the thermoplastic skin 205 and a thermoplastic rib 207. In operation, the induction welding coil 204 is energized with an electromagnetic current that can then transfer energy to composite components, such as the thermoplastic skin 205 and the thermoplastic rib 207 to inductively weld the thermoplastic skin 205 and the thermoplastic rib 207 together. It should be noted that any suitable induction welding process can be used. That is, one or more different induction welding systems can be used in combination with the heatsink 100 to perform induction welding using induction welding techniques. The heatsink 100 is placed on an outer mold line (OML) 219 of the thermoplastic skin 205.

In one implementation, the induction welding machine 203 is configured to move the induction welding coil 204. In one implementation, the induction welding machine 203 is the induction welding machine 600 described in the description of FIG. 6 below. The induction welding machine 203 controls an amount of current applied to the induction welding coil 204 in order to increase or decrease a magnetic field generated by the induction welding coil 204. This in turn controls a temperature of a weld interface between thermoplastic parts (e.g., the thermoplastic skin 205 and the thermoplastic rib 207) where induction welding is desired. Thus, the induction welding coil 204 generates a magnetic field at one side of the thermoplastic components in response to applied current. The intensity of the magnetic field that is generated is based on the amount of current applied. As such, the induction welding coil 204 is controllably adjusted in order to generate magnetic fields of desired strength, and with the heatsink 100 of the present disclosure, improved welding can be performed, particularly along parts have contoured profiles, different shaped surfaces, etc. by having more contact between the heatsink 100 and the parts (e.g., more of the surfaces are in contact with each other, such as along the entirety of the other geometry of the parts).

In one example, an entirety of the contact surface 114 of the plurality of tiles 103 is in "intimate" contact with the thermoplastic skin 205 during the induction welding. This contact can include 100% surface to surface contact, 95% surface to surface contact, or some other percentage that is improved over having a planar heatsink. For example, the heatsink 100 allows increased surface contact with control surfaces on an aircraft that have double curvature skins (e.g., two spaced apart surfaces having complementary curves) with the heatsink 100 matching the outer mold line geometry.

In some examples, the second contour 110, i.e., the contour of the contact surface 114 of the plurality of tiles 103, is complementary to (e.g., or matches) a contour, or curve, of the thermoplastic skin 205. The second contour 110 can include a contour of one or more individual tiles 103 that matches the contour of the thermoplastic skin 205. For example, not all tiles 103 of the plurality of tiles 103 are shaped with a contour on the contact surface 114. Only the tiles 103 of the plurality of tiles 103 in contact with a curved portion of the thermoplastic skin 205 have a complementary contour. As shown in FIG. 2A, the contoured profile of the carrier sheet 101 is shaped to resemble (e.g., is complementary or matches) the contour of the plurality of tiles 103 and therefore also resembles or is complementary to the contour 217 of the thermoplastic skin 205. Accordingly, in some implementations, the contour 107 of the carrier sheet 101 is identical to the contour 217 of the thermoplastic skin 205. In other implementations, the contour 107 of the carrier sheet 101 is similar to the contour 217 of the thermoplastic skin 205, but varies in terms of the particular angles and degrees of the contours. That is, the carrier sheet 101 substantially matches or conforms to the profiled of the thermoplastic skin 205. For example, the radius of the contour 107 is different than the radius of the contour 217. In one implementation, there is a degree, or element, of distortion to the contour 107 due to an imperfect fit between the second contour 110 and the contour 217.

The thermoplastic skin 205 in the illustrated example is a thermoplastic composite part that includes a slight contour 217 on the outer mold line (OML) 219 as described above. The thermoplastic composite in one example includes conductive carbon fibers. In some implementations, the thermoplastic skin 205 is a feature of a chine, such as the chine 300 described below (see FIG. 3), implemented on a wing of an airplane or drone. However, the thermoplastic skin 205 can be implemented in other structures without departing from the scope of the present disclosure. As can be seen, the thermoplastic skin 205 is in contact with the thermoplastic rib 207. The thermoplastic rib 207 is a thermoplastic composite stiffening structure that provides structural, interior support for the wing in which the thermoplastic skin 205 and thermoplastic rib 207 are implemented. When implemented using the induction welding setup 200 shown in FIGS. 2A-2C, the thermoplastic skin 205 is arranged in-between the heatsink 100 and the thermoplastic rib 207. The thermoplastic rib 207 is a thermoplastic composite that can include a contoured shape or profile complementary to the contour of the thermoplastic skin 205. The thermoplastic composite includes conductive carbon fibers in one example. The thermoplastic rib 207 is welded to the thermoplastic skin 205 by the induction welding process performed using the induction welding setup 200. It should be noted that the thermoplastic rib 207 includes a flange 206. Prior to the induction welding process being performed, the flange 206 can be adjusted to close, and thereby eliminate, a gap between the thermoplastic rib 207 and the thermoplastic skin 205. For example, the closed gap can be due to a portion of the thermoplastic rib 207 that is unsupported at the thermoplastic skin 205.

The induction welding setup 200 further includes a clamp 209. In some implementations, the clamp 209 is a pressure bladder made of silicon. However, the clamp 209 can be made of any suitable material without departing from the scope of the present disclosure. The clamp 209 is filled with air during operation. As the clamp 209 is filled with air, the clamp 209 inflates and, through the inflation, applies pressure to the thermoplastic rib 207 by impinging upon the thermoplastic rib 207, which clamps the thermoplastic rib 207 in place for the induction welding. In some implementations, the clamp 209 inflates and expands to a point that pressure is applied to the flange 206, pushing the flange 206 into the thermoplastic skin 205. Pushing the flange 206 into the thermoplastic skin 205 closes, and thereby eliminates, a gap between the thermoplastic rib 207 and the thermoplastic skin 205 when a sufficient amount of pressure has been applied by the flange 206. This clamps together the thermoplastic rib 207 and the thermoplastic skin 205, which in turn allows for a stronger bond and cleaner weld between the thermoplastic rib 207 and the thermoplastic skin 205. The elimination of the gap is essential to the induction welding process because while the gap exists, the induction welding process cannot be performed.

The induction welding setup 200 further includes an inner rib non-conductive tooling 211 that locks into the thermoplastic rib 207. The inner rib non-conductive tooling 211 is arranged such that the clamp 209 is placed between the inner rib non-conductive tooling 211 and the thermoplastic rib 207 as shown in FIG. 2A. The inner rib non-conductive tooling 211 provides pressure in a first direction 215 on the thermoplastic rib 207 by preventing movement of the thermoplastic rib 207 while the non-conductive tooling block 201 provides pressure in a second direction 216, opposite the first direction 215, on the heatsink 100, which applies pressure on the thermoplastic skin 205. For example, from the perspective shown in FIG. 2A, the inner rib non-conductive tooling 211 provides pressure in a first direction 215 and the non-conductive tooling block 201 provides pressure in a second direction 216 opposite the first direction 215. For example, as shown in FIG. 2A, the first direction 215 is upward toward the thermoplastic rib 207 and the second direction 216 is downward toward the thermoplastic skin 205. The terms "upward" and "downward" are used only as examples based on the perspective shown in FIG. 2A to illustrate that inner rib non-conductive tooling 211 and the non-conductive tooling block 201 provide pressure toward one another. The resulting pressures in the first direction 215 directs the thermoplastic rib 207 toward the thermoplastic skin 205 and the second direction 216 direct the thermoplastic skin 205 toward the thermoplastic rib 207. The pressures in the first direction 215 and the second direction 216 help to clamp the thermoplastic skin 205 and the thermoplastic rib 207 together during the induction welding process.

As described herein, the induction welding setup 200 includes the heatsink 100, the non-conductive tooling block 201, the induction welding machine 203 including the induction welding coil 204, the clamp 209, and the inner rib non-conductive tooling 211. The heatsink 100 is placed on the thermoplastic skin 205 and the clamp 209 is placed on the thermoplastic rib 207. The inner rib non-conductive tooling 211 is placed on the clamp 209 and the clamp 209 is filled with air to apply upward pressure to the thermoplastic rib 207. The non-conductive tooling block 201 is placed on the heatsink 100 to apply downward pressure.

In one example, each tile 103 of the plurality of tiles 103 is individually machined to match the contour of the thermoplastic skin 205 to thereby allow surface to surface contact when the above-discussed pressure is applied. In this manner, there is a minimal gap 106 between each adjoining tile of the plurality of tiles 103 when the induction welding setup 200 is assembled. In some implementations, a set or group of the tiles 103 are machined together or at the same time. Due to the minimal size of the gaps 106, flexing of the tiles 103 when bonded to the carrier sheet 101 is minimized as well. A larger gap 106 between two tiles 103 would facilitate increased flexing of one or both of the tiles 103, leading to removal and replacement of the particular tile 103.

Once the induction welding setup 200 is assembled, induction welding of the thermoplastic skin 205 and the thermoplastic rib 207 can commence. The induction welding coil 204 of the induction welding machine 203 is placed above the heatsink 100 between two non-conductive tooling blocks 201 as shown in FIG. 2B. An electromagnetic current, that includes a magnetic field 220, is introduced through the induction welding coil 204. The magnetic field from the electromagnetic current excites the conductive carbon fibers in the thermoplastic skin 205 and the thermoplastic rib 207 and creates heat in the laminates. In so doing, the heatsink 100 helps to pull heat out of the thermoplastic surfaces so as to maintain the surface of the thermoplastic skin 205, with which it is in contact, at a temperature below the welding temperature while the surfaces of the thermoplastic skin 205 and the thermoplastic rib 207 to be inducted welded together are maintained at a temperature conducive to inductive welding.

In one implementation, induction welding is facilitated by the heatsink 100 drawing off heat. The heatsink 100 is nonconductive and therefore unaffected by the induction magnetic field. The heatsink 100 helps to draw off excess heat from the surface of the thermoplastic skin 205 with which it is in contact, to maintain the surface of the thermoplastic skin 205, with which it is in contact, at a temperature below the welding temperature. In particular, the heatsink 100 absorbs heat generated by the conductive carbon fibers of the thermoplastic skin 205 and the thermoplastic rib 207 during the induction welding process. Various implementations of the present disclosure allow the induction welding coil 204 to perform induction welding of the thermoplastic skin 205 and the thermoplastic rib 207 due to the second contour 110 and thin profile of the heatsink 100. The thin profile of the heatsink 100 allows the current from the induction welding coil 204 to be maintained at a lower voltage. In these implementations, the induction welding coil 204 is not in contact with the thermoplastic components to be induction welded. Instead, the heat is managed from the induction welding coil 204 and drawn off by the heatsink 100. In this implementation, the heat can be more effectively controlled by the heatsink 100, which prevents local melting of the surface to be welded, and thereby also results in an increased weld quality.

Figure 3:
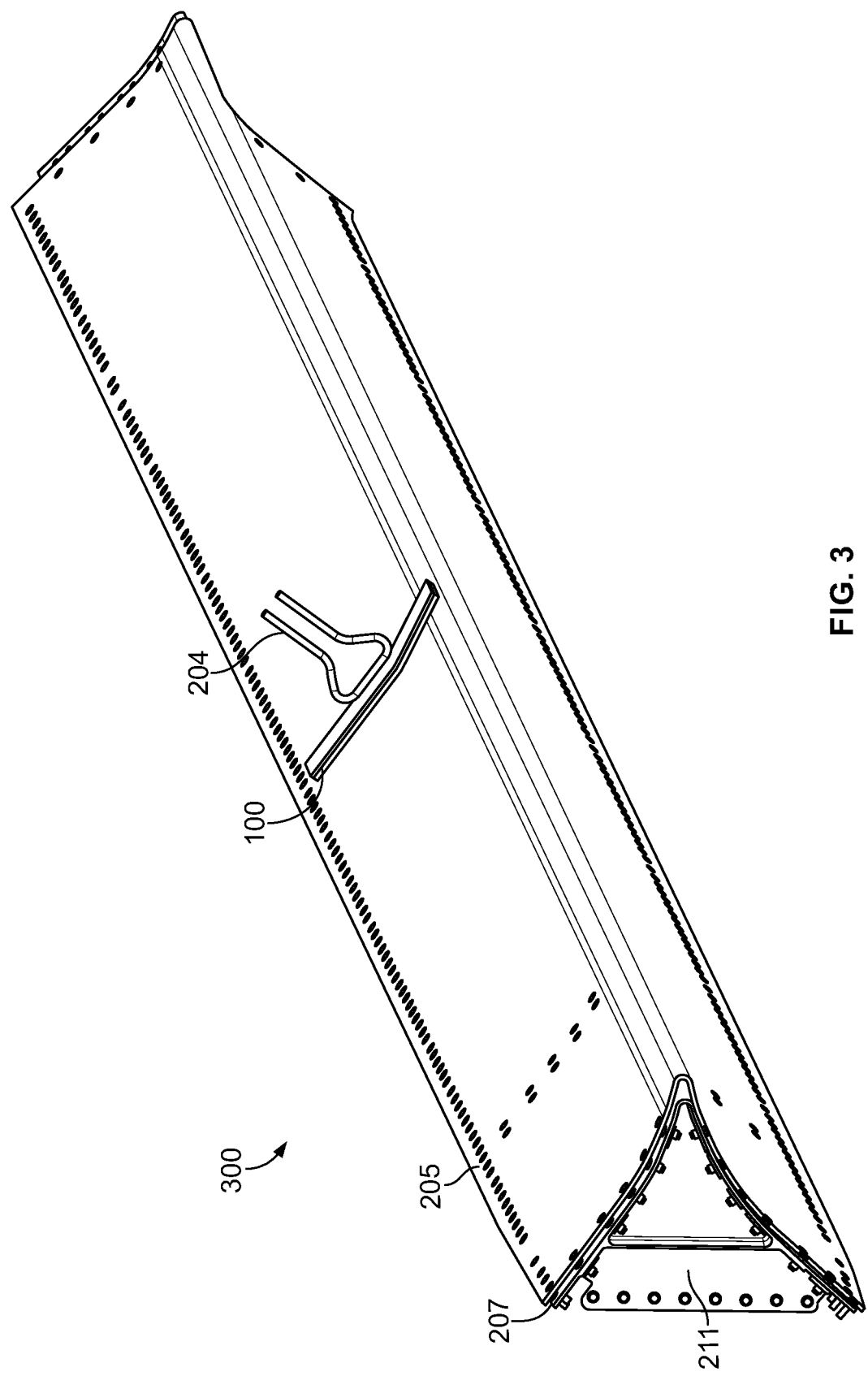
FIG. 3 illustrates a top perspective view of the induction welding apparatus on a chine according to various implementations of the present disclosure.

FIG. 3 illustrates a top perspective view of an induction welding setup on a chine according to various implementations of the present disclosure. The example of a chine 300 illustrated in FIG. 3 is for illustration only. Other implementations of the induction welding setup on a chine 300, or other part, can be used without departing from the scope of the present disclosure. Moreover, for ease in illustration, only the induction welding coil 204 and heatsink 100 are shown in FIG. 3.

FIG. 3 illustrates the heatsink 100 implemented on the chine 300. In some implementations, the chine 300 is the outer machine layer of the thermoplastic skin 205. FIGS. 2A-2C illustrates the induction welding setup 200 on a local scale, including the particular thermoplastic rib 207 being induction welded to the thermoplastic skin 205. FIG. 3 illustrates application on a larger scale, showing the thermoplastic skin 205 as part of a chine 300. In some implementations, the induction welding coil 204 can move along the chine 300 from the location of one thermoplastic rib 207 to the next.

In some implementations, the induction welding coil 204 welds a first thermoplastic rib 207 to the thermoplastic skin 205 and then is moved to the next thermoplastic rib 207. In other words, the heatsink 100, non-conductive tooling block 201, induction welding machine 203, induction welding coil 204, clamp 209, and inner rib non-conductive tooling 211 are moved to the next thermoplastic rib 207 to induction weld the next thermoplastic rib 207 to the thermoplastic skin 205. This process continues until each thermoplastic rib 207 is induction welded to the thermoplastic skin 205. As can be seen, the heatsink 100 conforms to the profile of the chine 300 to allow for improved welding due in part to the increased surface to surface contact between the heatsink 100 and the surface of the chine 300.

Figure 4:
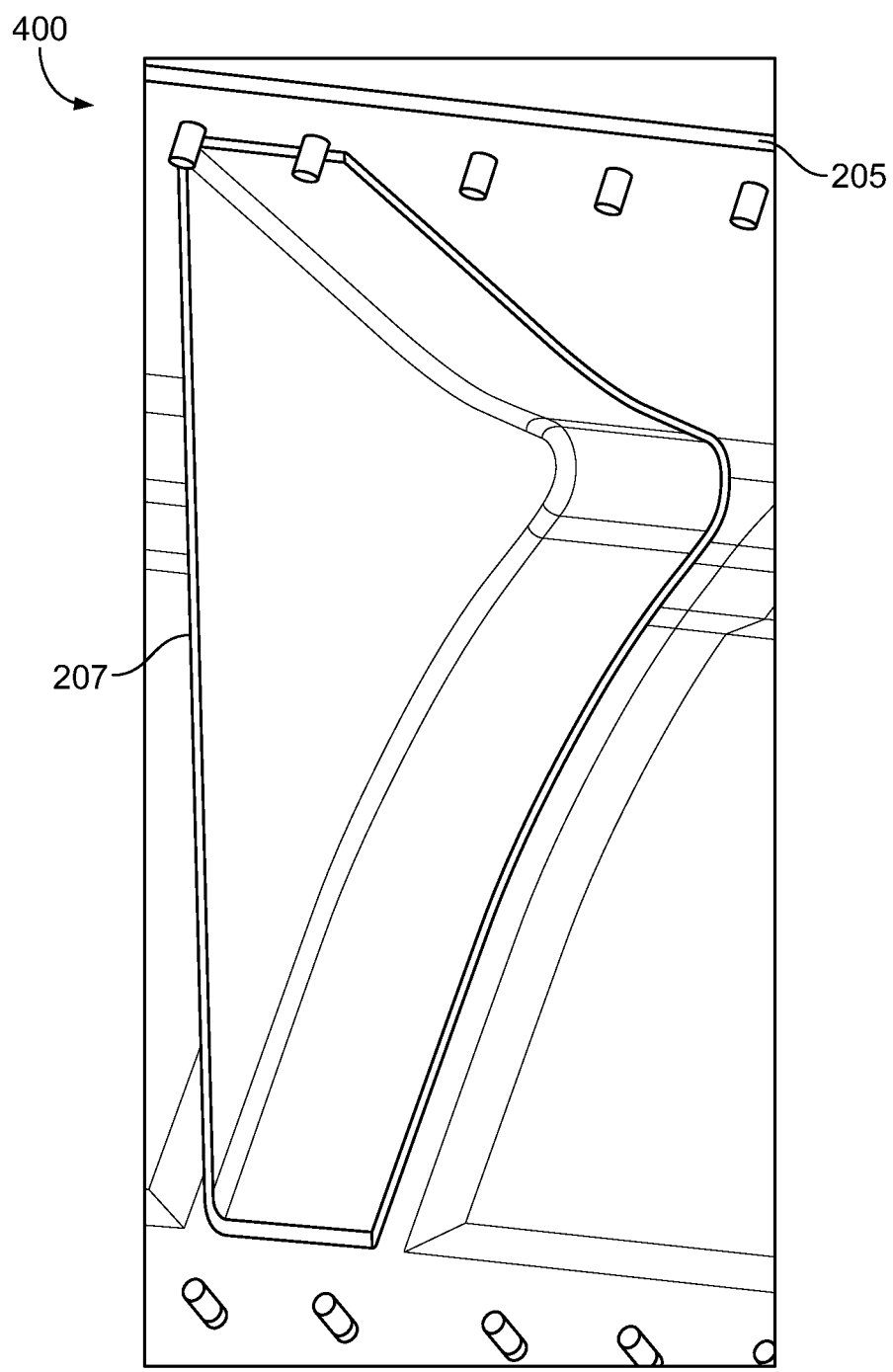
FIG. 4 illustrates welded thermoplastic components according to various implementations of the present disclosure.

FIG. 4 illustrates welded thermoplastic components according to various implementations of the present disclosure. The example of the welded thermoplastic components illustrated in FIG. 4 is for illustration only. Other implementations of welded thermoplastic components can be used without departing from the scope of the present disclosure.

The welded thermoplastic components 400 illustrated in FIG. 4 include the thermoplastic skin 205 and the thermoplastic rib 207. As shown in FIG. 4, the features of the induction welding apparatus, including the heatsink 100, non-conductive tooling block 201, induction welding machine 203 and induction welding coil 204, clamp 209, and inner rib non-conductive tooling 211 have been removed following the induction welding. The welded thermoplastic skin 205 and thermoplastic rib 207 are shown in FIG. 4 in intimate contact, including the contoured, or curved, surfaces. As described herein, intimate contact refers to any gap between the thermoplastic skin 205 and the thermoplastic rib 207 being removed by the induction welding process. In other words, there is no space between the thermoplastic skin 205 and the thermoplastic rib 207 following the induction welding process. That is, the heatsink 100 allows for an improved weld along a contoured surface.

Figure 5:
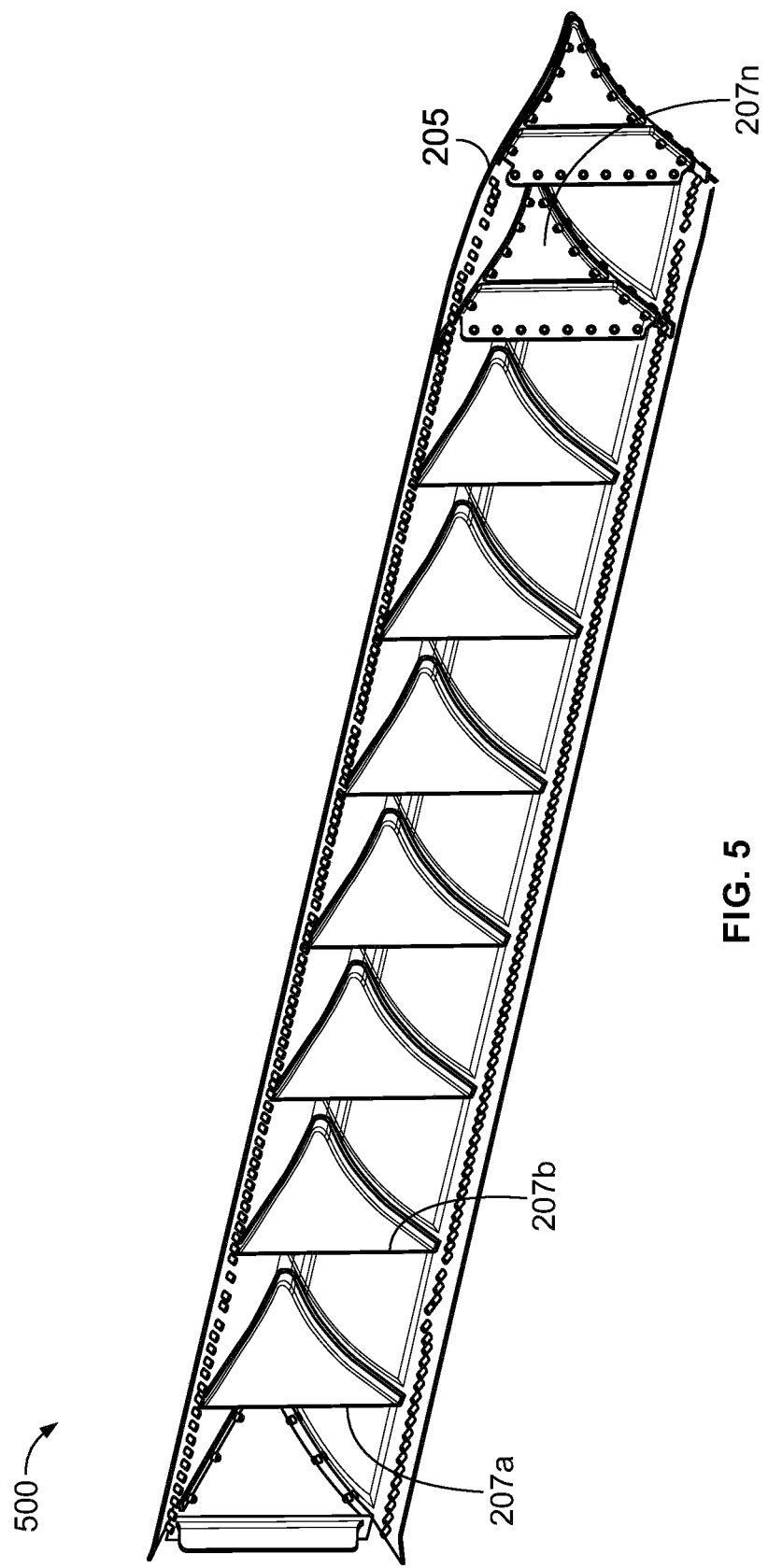
FIG. 5 illustrates a chine with welded components according to various implementations of the present disclosure.

FIG. 5 illustrates a chine according to various implementations of the present disclosure. The example of the chine 500 illustrated in FIG. 5 is for illustration only. Other implementations of a chine can be used without departing from the scope of the present disclosure.

The chine 500 can be the chine 300 illustrated in FIG. 3. As shown in FIG. 5, the chine 500 includes the thermoplastic skin 205 welded to a plurality of thermoplastic ribs 207a-207n. For example, the chine 500 includes a plurality of thermoplastic ribs 207a, 207b, 207n. The chine 500 can include any number of thermoplastic ribs 207 without departing from the scope of the present disclosure. Each of the thermoplastic ribs 207 is induction welded to the thermoplastic skin 205 separately as described herein based upon the position of the induction welding coil 204 along the chine 500 at a particular point in time. Again, the use of the heatsink 100 as described herein allow for improved induction welding along curved or contoured surfaces.

Figure 6:
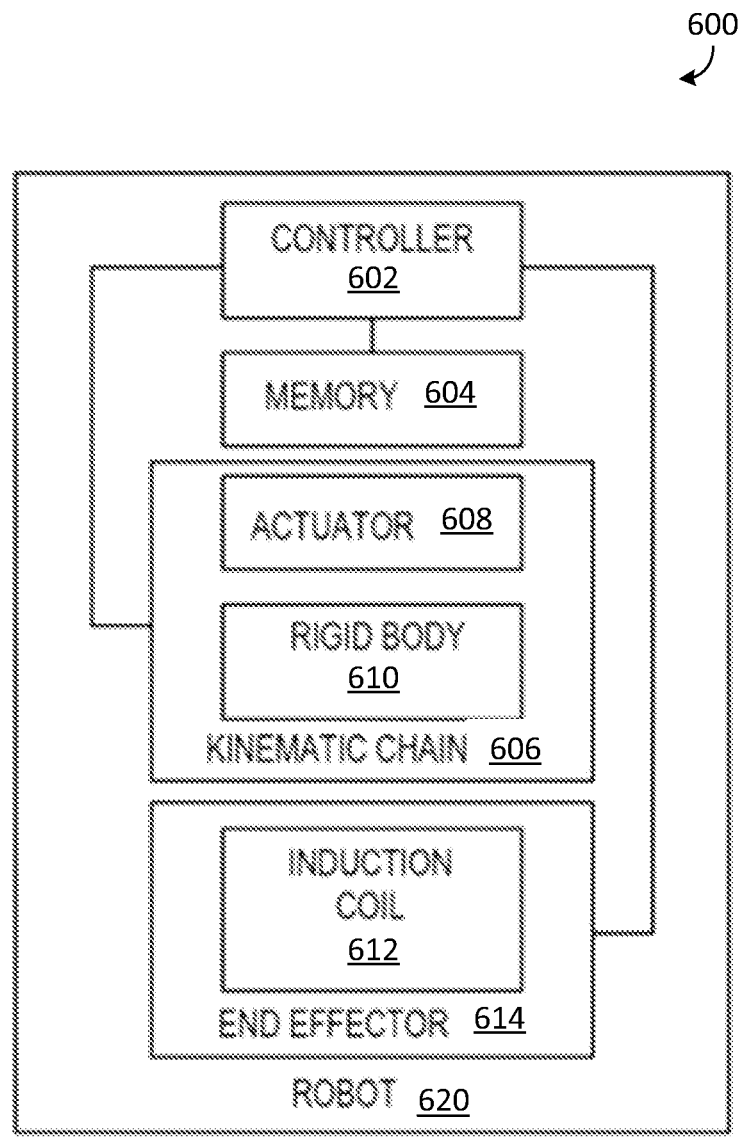
FIG. 6 illustrates a block diagram of an induction welding machine according to various implementations of the present disclosure.

FIG. 6 illustrates a block diagram of an induction welding machine 600 according to various implementations of the present disclosure. The example of the induction welding machine 600 illustrated in FIG. 6 is for illustration only. Other implementations of an induction welding machine 600 can be used without departing from the scope of the present disclosure. The induction welding machine 600 can be used with the induction welding setup 200 or with other aspects of the present disclosure.

In this example, the induction welding machine 600 includes a robot 620, which has a controller 602 and a memory 604 for managing the operations of a kinematic chain 606 comprising one or more actuators 608 and one or more rigid bodies 610. By controlling the motions of kinematic chain 606, the position, speed, and/or direction of an end effector 614 bearing an induction welding coil 612 may be adjusted. In some implementations, the induction welding coil 612 is the induction welding coil 204 described above. The controller 602 further controls an amount of current applied to the induction welding coil 612, in order to increase or decrease a magnetic field generated by the induction welding coil 612. This in turn controls a temperature of a weld interface between the thermoplastic skin 205 and the thermoplastic rib 207 where induction welding is desired. The controller 602 can be implemented, for example, as custom circuitry, as a hardware processor executing programmed instructions, or some combination thereof. The controller 602 can further direct the operations of the various components of the robot 620 in accordance with instructions stored in a Numerical Control (NC) program stored in the memory 604.

The induction welding coil 612 generates a magnetic field at the thermoplastic skin 205 in response to applied current. The intensity of the magnetic field that is generated is based on the amount of current applied. Thus, the induction welding coil 612 is controllably adjusted in order to generate magnetic fields of desired strength.

In operation, the magnetic fields generated by induction welding coil 612 causes thermoplastic elements being welded to reach a transition temperature. For example, at the transition temperature, the thermoplastic element in the thermoplastic skin 205 melds or welds with the thermoplastic element in the thermoplastic rib 207. This merges the thermoplastic elements in each of the thermoplastic skin 205 and the thermoplastic rib 207 into an integral mass that cools into a single matrix of thermoplastic. The thermoplastic elements can comprise any suitable thermoplastic, such polyetheretherketone (PEEK), polyetherketoneketone (PEKK), etc.

Computer executable instructions may be provided using any computer-readable media that are accessible by the induction welding machine 600. Computer-readable media may include, without limitation, computer storage media such as the memory 604 and communications media. Computer storage media, such as the memory 604, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that is usable to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium, such as the memory 604, is shown within the induction welding machine 600, it will be appreciated by a person skilled in the art, that the storage may be distributed or located remotely and accessed via a network or other communication link (e.g., using a communication interface).

Figure 7:
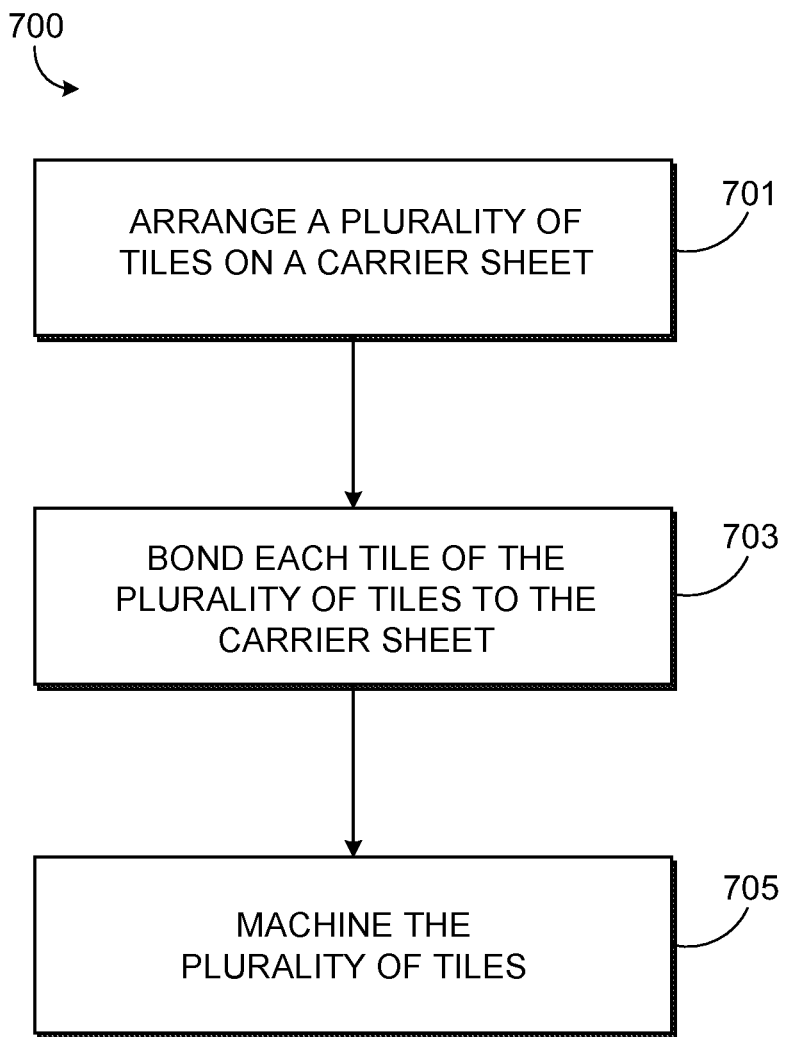
FIG. 7 illustrates a method of manufacturing a heatsink according to various implementations of the present disclosure.

FIG. 7 illustrates a method of manufacturing a heatsink according to various implementations of the present disclosure. The method 700 can be implemented by the induction welding machine 600 illustrated in FIG. 6 above or by any other suitable device. Various implementations of the method 700 can be performed without departing from the scope of the present disclosure.

In operation 701, a plurality of tiles are arranged on a carrier sheet. In some implementations, the plurality of tiles are the tiles 103 and the carrier sheet is the carrier sheet 101. As described herein, the carrier sheet 101 has a contoured profile and is electrically non-conductive and thermally non-conductive. Each tile 103 of the plurality of tiles 103 is thermally conductive and electrically non-conductive. In one example, each tile 103 of the plurality of tiles 103 includes a bonding surface 112 and a contact surface 114 opposite the bonding surface 112. The contact surface 114 is configured to contact a structure to be induction welded, such as the thermoplastic skin 205. In some implementations, the plurality of tiles 103 are flat, ceramic billets when arranged on the carrier sheet 101.

In operation 703, the bonding surface 112 of each tile of the plurality of tiles 103 is bonded to the carrier sheet 101. As described herein, the bonding surface 112 can be bonded to the carrier sheet by an adhesive 105, such as an epoxy resin, such that an entirety (or a substantial entirety) of the bonding surface 112 of each of the plurality of tiles 103 is bonded to the carrier sheet 101. In other words, no portion of the bonding surface 112 is not in contact with the carrier sheet 101 in some examples. In other examples, most of the bonding surface 112 is in contact with the carrier sheet 101.

In operation 705, the contact surface 114 of each tile of the plurality of tiles 103 is machined to create a contoured shape. In some implementations, the plurality of tiles 103 are machined from a flat, ceramic billet into a contoured shape complementary to the contour of the structure to be induction welded, such as the thermoplastic skin 205. In various implementations, machining the contact surface 114 of each tile 103 of the plurality of tiles 103 allows each tile 103 to be more precisely machined and more easily replaced in the event of damage or an imperfect machination. Furthermore, machining the contact surface 114 of each tile of the plurality of tiles 103 can allow the machination process to be automated, saving time and labor costs. At the conclusion of operation 705, the heatsink 100, illustrated in FIG. 1 and described above, is manufactured and completed.

Thus, the tile 103 when bonded to the carrier sheet 101 generally match or follow the contour of the carrier sheet 101. That is, the contact surface 114 of each tile 103 generally follows the contour of the carrier sheet 101. The machining of the contact surface 114 of each tile 103 defines a more precise contour to match the contour of, for example, the parts to be induction welded (and complementary to the contour of the carrier sheet 101). In some implementations, the method 700 is used to assemble a portion of an aircraft, such as the aircraft 900.

Figure 8:
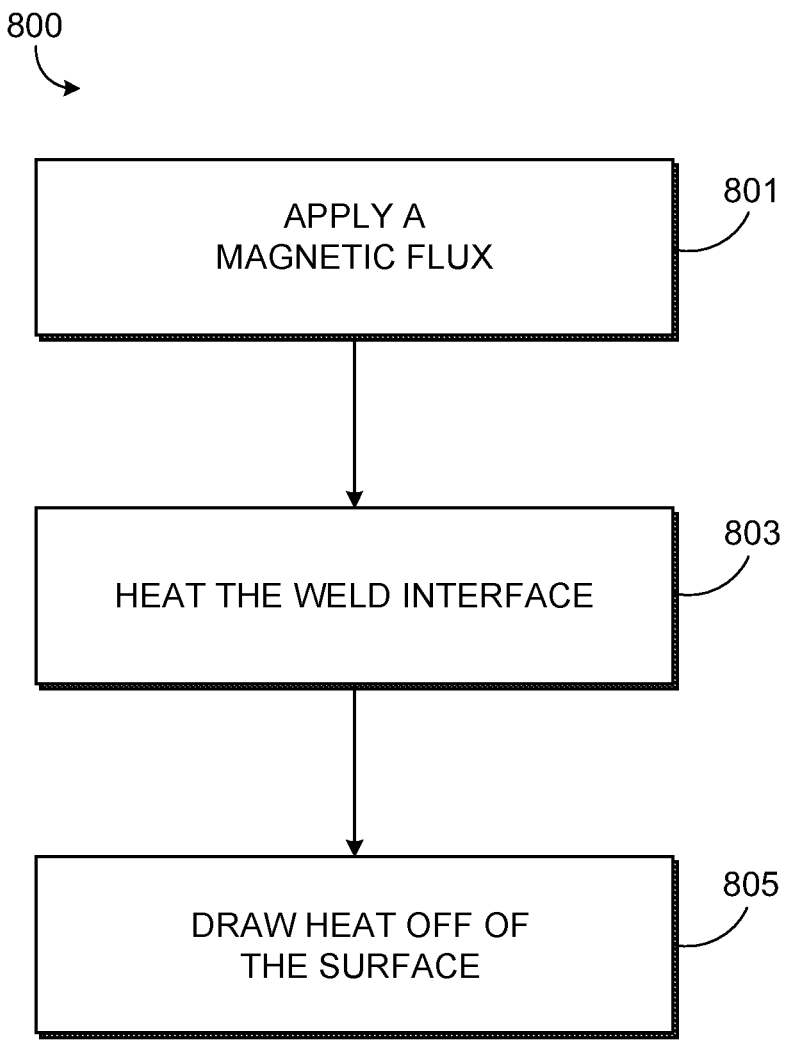
FIG. 8 illustrates a method of drawing heat off of a heatsink according to various implementations of the present disclosure.

FIG. 8 illustrates a method of drawing heat off of a surface using a heatsink according to various implementations of the present disclosure. The method 800 can be implemented by the heatsink 100 illustrated in FIG. 1 above or by any other suitable device. Various implementations of the method 800 can be performed without departing from the scope of the present disclosure.

In the method 800, an induction welding coil, such as the induction welding coil 204 is positioned at components to be welded. For example, the induction welding coil 204 is positioned for induction welding of a first thermoplastic component, such as the thermoplastic skin 205, to a second thermoplastic component, such as the thermoplastic rib 207. The induction welding coil 204 can be positioned above the heatsink 100, which is placed on the thermoplastic skin 205. In operation 801, a magnetic flux is applied to the weld interface between the thermoplastic skin 205 and the thermoplastic rib 207 using the induction welding coil 204. The magnetic flux can be generated by the induction welding machine 600. In operation 803, the magnetic flux heats the weld interface between the thermoplastic skin 205 and the thermoplastic rib 207. In particular, the magnetic flux excites the conductive carbon fibers in the thermoplastic components. As described herein, the heatsink 100, placed between the induction welding coil 204 and the thermoplastic skin 205, includes the contact surface 114 with a second contour 110 that is configured to contact a structure to be induction welded, such as the thermoplastic skin 205. The second contour 110 is complementary to the contour 217 of the thermoplastic skin 205.

In operation 805, heat is drawn off of a contoured surface, such as the contour 217, of the thermoplastic skin 205 by the heatsink 100. In particular, the contact surface 114 draws off heat from the contour 217 of the thermoplastic skin 205 due to the complementary nature of the second contour 110 to the contour 217 surface through the process of thermal conduction. By drawing off the heat, the heatsink 100 cools the contacting surface of the two or more thermoplastic components to be induction welded Various implementations of the present disclosure provide an improved, i.e. more efficient and effective, removal of heat from the contour 217 surface to the heatsink 100 due to the complementary nature of the second contour 110 to the contour 217 on the OML 219 during the induction welding process.

In some implementations, the heatsink 100 includes the carrier sheet 101 and the plurality of tiles 103. The method 800 can further include forming the first contour 108 on the bonding surface 112 of the heatsink 100 and forming the second contour 110 on a subset of the plurality of tiles 103 that matches a surface of one of the two or more thermoplastic components to be induction welded, such as the contour 217 of the thermoplastic skin 205. In some implementations, the method 800 is used to assemble a portion of an aircraft, such as the aircraft 900.

Figure 9:
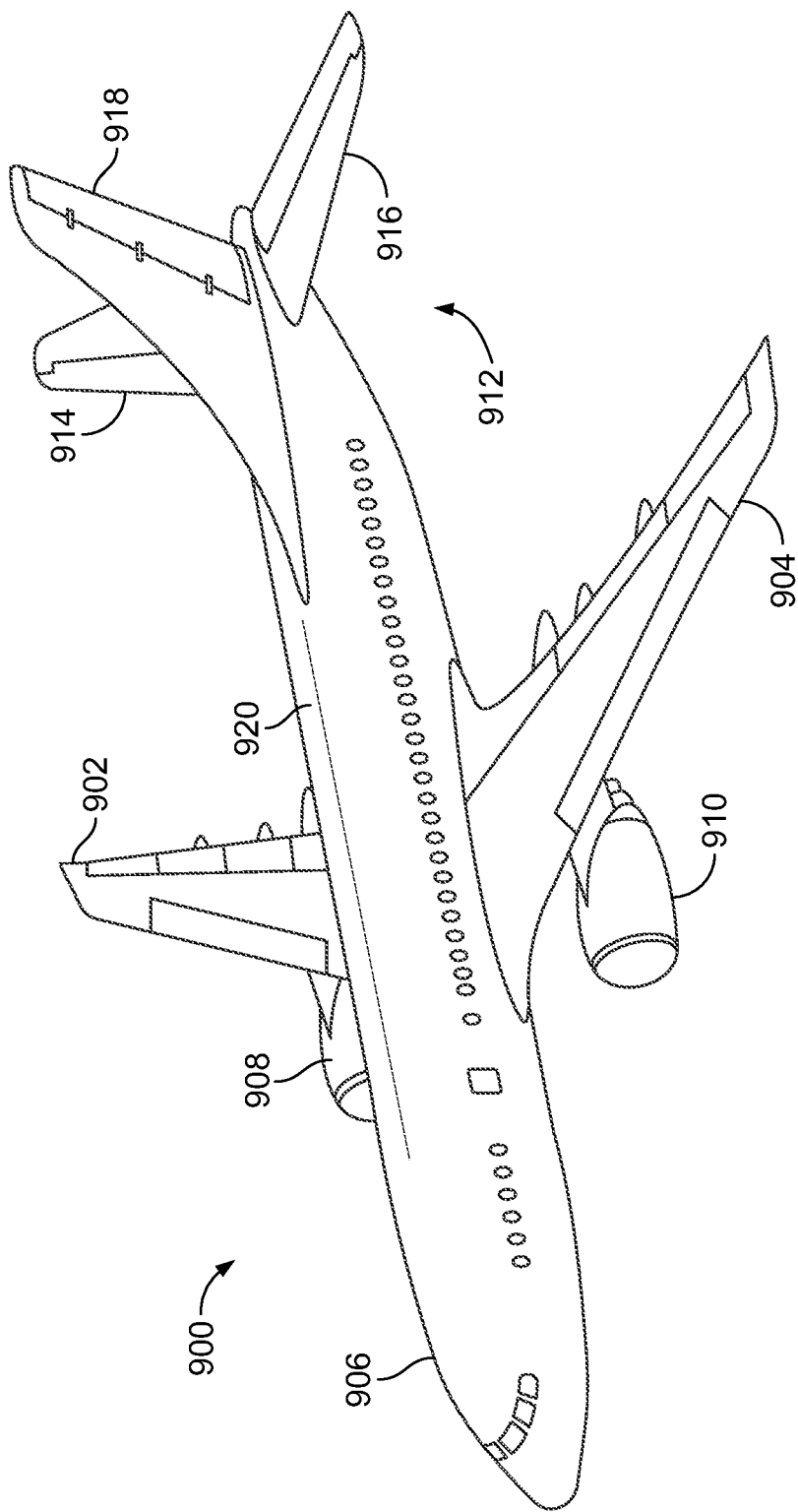
FIG. 9 illustrates a schematic perspective view of an aircraft in which induction welding can be performed according to various implementations of the present disclosure.

One or more examples allow for fabrication of composite parts, such as thermoplastic aircraft parts for an aircraft 900 as illustrated in FIG. 9. The aircraft 900 has a wing 902 and a wing 904 attached to a body 906. The aircraft 900 also includes an engine 908 attached to the wing 902 and an engine 910 attached to the wing 904. The body 906 has a tail section 912 with a horizontal stabilizer 914, a horizontal stabilizer 916, and a vertical stabilizer 918 attached to the tail section 912 of the body 906. The body 906 in some examples has a composite skin 920.

The aircraft 900 is an example of an aircraft in which welded thermoplastic structures can be implemented in accordance with various examples described herein. In one particular example as described in more detail herein, a composite bracket and blade stringer of the aircraft 900 is a welded thermoplastic structure formed according to the present disclosure. In other examples, a structural support such as a spar, rib, or other structural support of the wing 902, the wing 904, or the body 906 welded to another component comprises a thermoplastic structure. For example, a structural support of the body 906 welded to the composite skin 920 can comprise a welded thermoplastic structure.

In some examples, the present disclosure allows induction welding of different geometries or configurations of parts with magnetic flux from the induction welding coil 204 applied to only one side of the components to be welded. For example, the induction welding coil 204 allows for induction welding of contoured parts (e.g., curved parts or geometries of the aircraft 900).

The illustration of the aircraft 900 is not meant to imply physical or architectural limitations to the manner in which an illustrative configurations can be implemented. For example, although the aircraft 900 is a commercial aircraft, the aircraft 900 can be a military aircraft, a rotorcraft, a helicopter, an unmanned aerial vehicle, or any other suitable aircraft.

Additionally, although the illustrative examples are described with respect to an aircraft, the present disclosure can be applied to other types of platforms. The platform can be, for example, a mobile platform, a stationary platform, a land-based structure, an aquatic-based structure, and a space-based structure. More specifically, the platform can be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Figure 10:
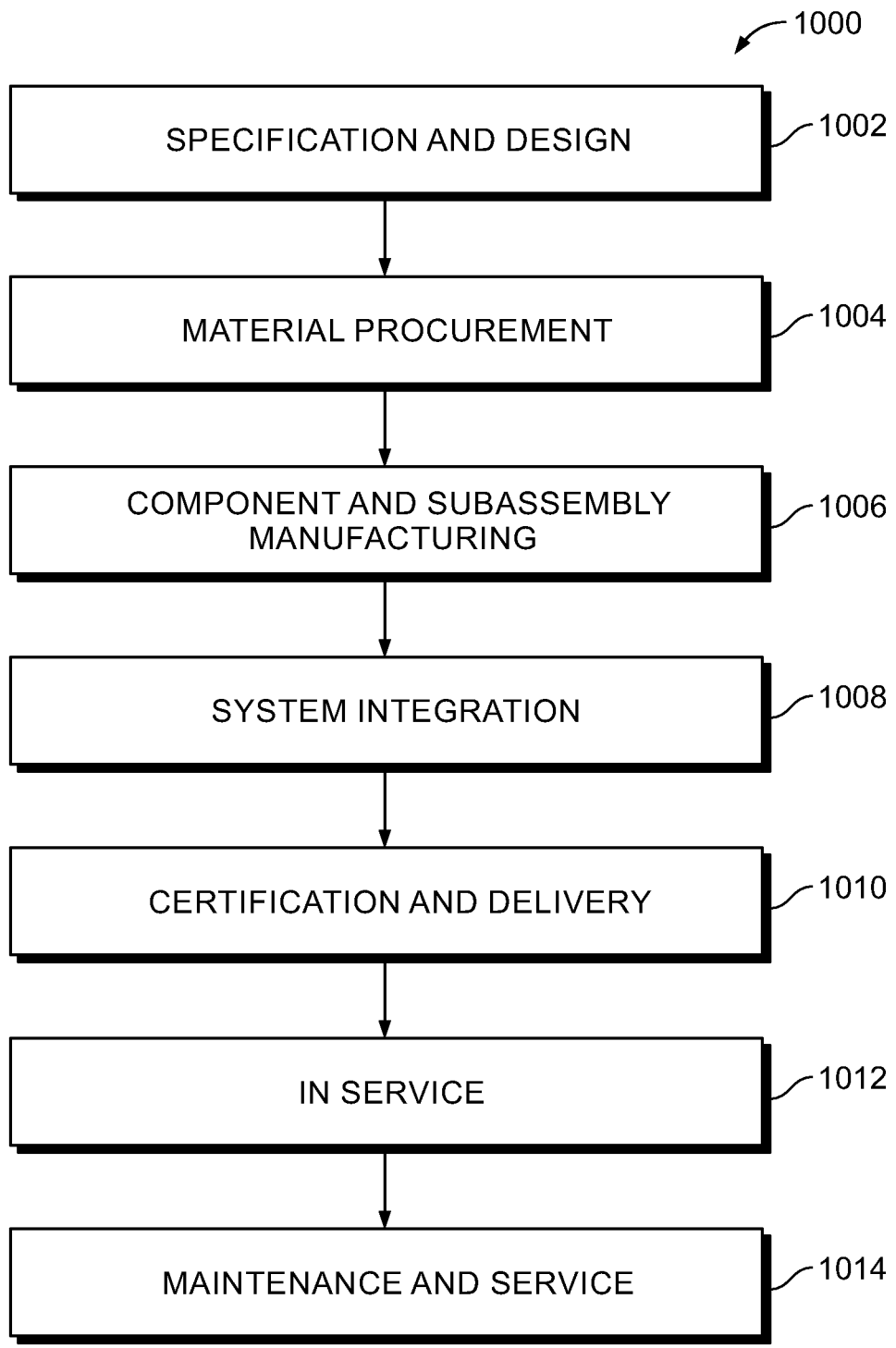
FIG. 10 illustrates a block diagram of an aircraft production and service methodology according to various implementations of the present disclosure.

Examples of the disclosure can be described in the context of an aircraft manufacturing and service method 1000 as shown in FIG. 10. During pre-production, the aircraft manufacturing and service method 1000 can include specification and design 1002 of an aircraft (e.g., the aircraft 900 shown in FIG. 9) and material procurement 1004. During production, component and subassembly manufacturing 1006 and system integration 1008 of the aircraft take place. Thereafter, the aircraft 900 can go through certification and delivery

1010 to be placed in service 1012. While in service by a customer, the 900 aircraft is scheduled for routine maintenance and service 1014 (which can also include modification, reconfiguration, refurbishment, and so on).

Each of the processes of the aircraft manufacturing and service method 1000 can be performed or carried out by a system integrator, a third party, and/or an operator (e.g., a customer). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

It should be noted that any number of other systems can be included with the system described herein. Also, although an aerospace example is shown, the principles can be applied to other industries, such as the automotive industry.

Apparatus and methods shown or described herein can be employed during any one or more of the stages of the aircraft manufacturing and service method 1000. For example, components or subassemblies corresponding to component and subassembly manufacturing 1006 can be fabricated or manufactured in a manner similar to components or subassemblies produced while the aircraft is in service. Also, one or more aspects of the apparatus, method, or combination thereof can be utilized during the production states of subassembly manufacturing 1006 and system integration 1008, for example, by substantially expediting assembly of or reducing the cost of the aircraft. Similarly, one or more aspects of the apparatus or method realizations, or a combination thereof, can be utilized, for example and without limitation, while the aircraft is in service, e.g., maintenance and service 1014.

Thus, various examples facilitate induction welding of parts by controlling the magnetic flux to improve the heating of (e.g., more uniformly heat) the weld interface between the parts from a single side of the parts. The present disclosure, including the examples described herein, can be implemented using different manufacturing environments.

The illustration of the manufacturing environment described herein is not meant to imply physical or architectural limitations to the manner in which an illustrative example is implemented. Other components in addition to or in place of the ones illustrated can be used. Some components can be removed. Also, the blocks are presented to illustrate some functional components. One or more of these blocks can be combined, divided, or combined and divided into different blocks when implemented in an illustrative example.

As indicated above, program code instructions may be stored in memory, and executed by processing circuitry that is thereby programmed, to implement functions of the systems, subsystems, tools, and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded, and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. It will also be understood that one or more functions, and combinations of functions, may be implemented by special purpose hardware-based computer systems and/or processing circuitry s which perform the specified functions, or combinations of special purpose hardware and program code instructions.

The following clauses describe further aspects of the present disclosure. In some implementations, the clauses described below can be further combined in any sub-combination without departing from the scope of the present disclosure.

Clause Set A:

A1: A heatsink, comprising:

a carrier sheet comprising an electrically non-conductive material, the carrier sheet having a contoured profile; and a plurality of tiles comprising a thermally conductive and electrically non-conductive material, each tile of the plurality of tiles having a bonding surface bonded to the carrier sheet and a contact surface opposite the bonding surface, wherein the contact surface is configured to contact a structure to be induction welded.

A2: The heatsink of clause A1, wherein the carrier sheet is a structurally rigid sheet.

A3: The heatsink of clause A1, wherein the carrier sheet is thermally non-conductive and the thermally non-conductive and electrically non-conductive material comprises a non-metal material.

A4: The heatsink of clause A1, wherein the plurality of tiles form a layer having a uniform thickness.

A5: The heatsink of clause A1, wherein a contour of the bonding surface is complementary to the contoured profile of the carrier sheet.

A6: The heatsink of clause A5, wherein:

the contact surface of at least a subset of tiles have a contoured shape, and the contoured shape of the contact surface of the subset of tiles matches a contour of the structure to be induction welded.

A7: The heatsink of clause A1, wherein an entirety of the bonding surface of each tile of the plurality of tiles is bonded to the carrier sheet.

A8: The heatsink of clause A1, wherein the plurality of tiles comprises ceramic billets.

A9: The heatsink of clause A8, wherein the ceramic billets comprise aluminum nitride.

A10: A method comprising fabricating a portion of an aircraft using the heatsink of clause A1.

Clause Set B:

B1: A method of manufacturing a heatsink, the method comprising:

arranging a plurality of tiles on a carrier sheet, wherein each tile of the plurality of tiles comprises a bonding surface and a contact surface opposite the bonding surface, wherein the contact surface is configured to contact a structure to be induction welded;

bonding the bonding surface of each tile of the plurality of tiles to the carrier sheet; and machining the plurality of tiles bonded to the carrier sheet such that the contact surface of the plurality of tiles includes a contoured shape.

B2: The method of clause B1, further comprising forming a first contour on the carrier sheet complementary to a second contour on the bonding surface.

B3: The method of clause B1, wherein machining the plurality of tiles includes machining the contact surface of each of the plurality of tiles from a flat ceramic billet to the contoured shape.

B4: The method of clause B1, wherein machining the plurality of tiles comprises machining the contact surface to form a uniform thickness of each of the plurality of tiles.

B5: The method of clause B4, further comprising forming the contoured shape of a subset of tiles to match a contour of the structure to be induction welded.

B6: A portion of an aircraft assembled according to the method of clause B1.

Clause Set C:

C1: An induction welding apparatus, the induction welding apparatus comprising:

a heatsink including a carrier sheet and a plurality of tiles bonded to the carrier sheet, the carrier sheet comprising an electrically non-conductive material, the carrier sheet having a contoured profile, the plurality of tiles comprising a thermally conductive and electrically non-conductive material, wherein each tile of the plurality of tiles includes a bonding surface bonded to the carrier sheet and a contact surface opposite the bonding surface;

an induction welding coil;

a clamp configured to apply pressure to two or more composite components to be induction welded, wherein the contact surface is configured to contact one of the two or more composite components to be induction welded; and a non-conductive tooling block contacting the carrier sheet of the heatsink, wherein the heatsink is between the non-conductive tooling block and the clamp, wherein the induction welding coil is configured to induction weld the two or more composite components together by generating an electromagnetic current.

C2: The induction welding apparatus of clause C1, wherein a contour of the bonding surface is complementary to the contoured profile of the carrier sheet.

C3: The induction welding apparatus of clause C1, wherein a subset of the plurality of tiles includes a contoured surface that is complementary to a surface of one of the two or more composite components.

C4: The induction welding apparatus of clause C1, wherein the induction welding coil is configured to induction weld the two or more composite components together at a temperature between 325° C. and 400° C.

C5: The induction welding apparatus of clause C1, wherein the carrier sheet is thermally non-conductive and the thermally non-conductive and electrically non-conductive material that comprises a non-metal material.

C6: The induction welding apparatus of clause C1, wherein each tile of the plurality of tiles comprises an aluminum nitride material.

C7: The induction welding apparatus of clause C1, wherein the plurality of tiles form a layer having a uniform thickness.

C8: A method comprising fabricating a portion of an aircraft using the apparatus of clause C1.

Clause Set D:

D1: A method of drawing off heat into a heatsink, the method comprising:

applying a magnetic flux to a weld interface between a first thermoplastic component and a second thermoplastic component;

heating the weld interface between the first thermoplastic component and the second thermoplastic component using the applied magnetic flux; and drawing, by the heatsink, heat off of a contoured surface of the first thermoplastic component.

D2: The method of clause D1, wherein the heatsink comprises a carrier sheet and a plurality of tiles, the method further comprises forming a contour on a bonding surface of the plurality of tiles complementary to a contoured profile of the carrier sheet, and the method further comprising forming a contour on a subset of the plurality of tiles that matches a surface of one of the two or more thermoplastic components to be induction welded.

D3: The method of clause D1, wherein the first thermoplastic component is a thermoplastic skin and the second thermoplastic component is a thermoplastic rib.

D4: The method clause D1, further comprising positioning an induction welding coil above the heatsink.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Although the present disclosure has been described with reference to various implementations, various changes and modifications can be made without departing from the scope of the present disclosure.

What is claimed is:

1. A heatsink, comprising:
    a carrier sheet comprising an electrically non-conductive material, the carrier sheet having a contoured profile, wherein the carrier sheet is a solid continuous sheet; and
    a plurality of tiles comprising a thermally conductive and electrically non-conductive material, each tile of the plurality of tiles having a bonding surface bonded to the carrier sheet and a contact surface opposite the bonding surface, wherein the contact surface is configured to contact a structure to be induction welded.

2. The heatsink of claim 1, wherein a contour of the bonding surface is complementary to the contoured profile of the carrier sheet.

3. The heatsink of claim 2, wherein:
    the contact surface of at least a subset of tiles have a contoured shape, and the contoured shape of the contact surface of the subset of tiles matches a contour of the structure to be induction welded.

4. The heatsink of claim 1, wherein the carrier sheet is a structurally rigid sheet.

5. The heatsink of claim 1, wherein the carrier sheet is thermally non-conductive and the thermally non-conductive and electrically non-conductive material comprises a non-metal material.

6. The heatsink of claim 1, wherein the plurality of tiles form a layer having a uniform thickness.

7. The heatsink of claim 1, wherein an entirety of the bonding surface of each tile of the plurality of tiles is bonded to the carrier sheet.

8. The heatsink of claim 1, wherein the plurality of tiles comprises ceramic billets, and wherein the ceramic billets comprise aluminum nitride.

9. An induction welding apparatus, the induction welding apparatus comprising:
    a heatsink including a carrier sheet and a plurality of tiles bonded to the carrier sheet, the carrier sheet comprising an electrically non-conductive material, the carrier sheet having a contoured profile, the plurality of tiles comprising a thermally conductive and electrically non-conductive material, wherein each tile of the plurality of tiles includes a bonding surface bonded to the carrier sheet and a contact surface opposite the bonding surface;
    an induction welding coil;
    a clamp configured to apply pressure to two or more composite components to be induction welded, wherein the contact surface is configured to contact one of the two or more composite components to be induction welded; and
    a non-conductive tooling block contacting the carrier sheet of the heatsink, wherein the heatsink is between the non-conductive tooling block and the clamp,
    wherein the induction welding coil is configured to induction weld the two or more composite components together by generating an electromagnetic current.

10. The induction welding apparatus of claim 9, wherein a contour of the bonding surface is complementary to the contoured profile of the carrier sheet.

11. The induction welding apparatus of claim 9, wherein a subset of the plurality of tiles includes a contoured surface that is complementary to a surface of one of the two or more composite components.

12. The induction welding apparatus of claim 9, wherein the induction welding coil is configured to induction weld the two or more composite components together at a temperature between 325° C. and 400° C.

13. The induction welding apparatus of claim 9, wherein the carrier sheet is thermally non-conductive and the thermally non-conductive and electrically non-conductive material that comprises anon-metal material.

14. The induction welding apparatus of claim 9, wherein each tile of the plurality of tiles comprises an aluminum nitride material.

15. The induction welding apparatus of claim 9, wherein the plurality of tiles form a layer having a uniform thickness.

* * * * *

UNITED STATES PATENT AND TRADEMARK OFFICE
CERTIFICATE OF CORRECTION

PATENT NO. : 11,904,554 B2
APPLICATION NO. : 17/585389
DATED : February 20, 2024
INVENTOR(S) : Eric David Zuelke It is certified that error appears in the above-identified patent and that said Letters Patent is hereby corrected as shown below:

In the Claims

At Column 21, Line 12, Claim 13, "anon-metal material" should be --a non-metal material--.

Signed and Sealed this
Twenty-sixth Day of March, 2024

Katherine Kelly Vidal
Director of the United States Patent and Trademark Office